United States Patent Office 3,342,572
Patented Sept. 19, 1967

3,342,572
METHOD OF MAKING CELLULAR PHOSPHATE GLASS
Thomas C. MacAvoy, Corning, N.Y., assignor to Corning Glass Works, Corning, N.Y., a corporation of New York
No Drawing. Filed Dec. 30, 1963, Ser. No. 334,608
6 Claims. (Cl. 65—22)

The present invention relates to the preparation of cellular glass and in particular to a method of forming cellular bodies of phosphate glass.

It is an object of the present invention to provide a method of forming cellular glass from a glass batch containing one or more glass-forming compounds of phosphorus. It is a further object to provide cellular glass materials useful as thermal insulators. It is a further object to provide a cellulating method which can be utilized to form a bubble opal glass. It is a further object to provide cellulated glass bodies wherein the cell walls are coated with elemental phosphorus and which are useful as a source of reactive phosphorus.

I have now found that the foregoing objects may be achieved by melting a glass-forming bath, containing one or more glass-forming compounds of phosphorus and a reducing agent, at a temperature in excess of 900° C. and cooling the resulting glass at a rate dependent on the degree of cellulation desired in the final glass.

The cellulation of the glass results from the evolution of gas as a result of chemical reactions taking place during the melting and cooling cycles. The gases which are generated in the molten glass are entrapped as bubbles which expand and impart a cellular structure to the mass. The cellulation begins during the cooling cycle at a temperature of about 900° C. and continues until the pressure of the expanding gases reaches a state of equilibrium with the atmosphere or until the glass becomes too viscous to yield to the pressure of the gases.

The glass batch compositions useful in the practice of the present invention should contain a glass-forming compound of phosphorus, a reducing agent, and be substantially free of compounds containing metals which are more readily reducible than phosphorus. The presence of such reducible compounds as compounds of cadmium, copper, lead, iron etc. should be avoided except as they may be present as minor impurities. Glasses generally useful include the phosphate glasses, such as alkali and alkali earth phosphate glasses, silico-phosphate glasses and alumino-phosphate glasses, to which there has been added up to about 5% by weight of a reducing agent such as sugar, carbon black, corn starch, silicon carbide, aluminum powder, magnesium powder, silicon powder, etc. A preferred method of the present invention resides in the use of a phosphate glass composition wherein $P_2O_5$ constitutes greater than 50 mol percent of the network forming constituents.

The cellulation may be accomplished during the initial cooling by cooling the molten glass from a temperature of about 900° C. at a rate sufficient to permit the formation of cells. Alternatively, the cellulation may be accomplished by cooling the glass quickly from about 900° C. and later reheating it until the viscosity of the glass is low enough to permit cellulation.

The characteristics of the resulting cellulated glass will be dependent on the degree of cellulation which has been permitted to occur. For example, if only very small bubbles are permitted to grow the resulting glass will be a bubble opal. If the bubbles are permitted a considerable degree of expansion the resulting product may be a foam glass of the type useful for thermal insulation purposes.

The degree of cellulation is governed by the composition of the glass, the viscosity of the glass, and the rate at which it is cooled through the cellulation range. Phosphorus is the primary agent of cellulation. The amount of cellulation which occurs is dependent on the amount of phosphorus contained in the glass batch.

The higher the viscosity of the glass at the cellulation temperature the smaller is the amount of cellulation for a given rate of cooling. As is known, the viscosity of a glass may be varied by varying the composition. For example, increasing amounts of $P_2O_5$ in the glass decreases the viscosity, whereas increasing amounts of $SiO_2$ increases the viscosity.

The more rapidly the glass is cooled through the cellulation range, the smaller will be the amount of cellulation. To achieve a desired degree of cellulation, the cooling rate must be varied with respect to the viscosity characteristics of the glass. Thus, the higher the viscosity of the glass, the longer the glass should be held in the cellulation temperature range to achieve a given degree of cellulation. However, the glasses should have a viscosity in the cellulation range sufficient to permit foaming or cellulation. For this purpose the glass should have a viscosity of between about $10^5$ and $10^{11}$ poises at a temperature of 900° C. or below.

Evidence indicates that the mechanism of cellulation is as follows: At the melting temperature, the reducing agent acts to reduce a portion of the phosphate group to $P_2$, which is soluble in the melt. The splitting of phosphate groups out of the network structure lowers the average chain length of the network formers and in effect acts to flux the melt.

As the molten glass is cooled, a phase consisting mainly of phosphorus separates out at about 900° C. The separation is believed to result from the reaction $P_4 \rightleftharpoons P_2$. The covalently bonded $P_4$ is believed to be less soluble than $P_2$. At this temperature $P_4$ is above its boiling point (280° C.) and if the viscosity of the glass is permissive, bubbles will form as a result of the vapor pressure of the $P_4$. When the cellulated glass reaches a temperature below 280° C. elemental phosphorus condenses on the cell walls.

The foregoing statements offer a possible explanation of the mechanism of cellulation. However, it is not intended to limit the present invention with respect to a particular theory or explanation.

In addition to uses as thermal insulators and as bubble opal glasses cellulated glass bodies, prepared in accordance with the present invention, are useful as a source of reactive phosphorus, wherein the phosphorus is encapsulated and may be released by crushing of the glass.

By way of further illustrating the invention and the manner in which it may be practiced the following specific examples are set forth.

Example I

A mixture, consisting of 25 grams of barium metaphosphate, 25 grams of potassium metaphosphate, 50 grams of aluminum metaphosphate and 5 grams of soluble starch, was heated in a porcelain crucible to about 1160° C. to form a clear molten glass. The molten glass was then poured on a steel plate at room temperature. On cooling, the clear glass changed to a translucent bubble opal glass. The cooled glass was then placed in an annealing oven at a temperature of about 550° C. for about 15 minutes and further cellulation occurred. The sample expanded to about twice its original thickness, before the expansion stopped. The glass was then cooled to room temperature. The cooled sample was a white foam glass with a bulk density of about 45 pounds per cubic foot. An analysis of the foamed glass revealed the presence of free phosphorus, as a coating on the cell walls.

Example II

A mixture, consisting of 50 grams of aluminum metaphosphate, 25 grams of barium metaphosphate and 25 grams of potassium metaphosphate, was ball milled for two hours. The mixture was then heated to about 1150° C. to form a clear molten glass. Five grams of 100 mesh silicon carbide were added and stirred into the molten glass. The clear molten glass was then cooled slowly. During the cooling when the temperature reached about 900° C. the glass began to foam and continued foaming until a temperature of 525° C. was reached. A foamed glass was obtained that had a fine-grained homogeneous structure, of the type found in foamed glass which is used for thermal insulation.

The cellulated glasses of the present invention may also be prepared from a mixture of a prepared phosphate glass frit and a reducing agent. This procedure is illustrated in the following example.

Example III 268 grams of lithium carbonate were reacted with 464 milliliters of phosphoric acid. The mixture was boiled to dryness in a 96%-silica glass container. The reaction mixture was then placed in a furnace and heated to 750° C. to yield a clear glass. The resultant clear glass was then cooled to room temperature and 100 grams of the glass were ground and mixed with 10 grams of dextrose. This mixture was then heated in a furnace at 1050° C. for 30 minutes. The resulting clear molten glass was poured on a steel plate at room temperature. As the glass cooled, opalization occurred. An examination of the cooled sample revealed that the opal appearance was due to the presence of numerous small bubbles within the glass.

It will be apparent to those skilled in the art that many variations and modifications of the invention as hereinabove set forth may be made without departing from the spirit and scope of the invention. The invention is not to be limited to those details shown above, except as set forth in the appended claims.

I claim:

1. A method for making cellular glass wherein the cell walls thereof are coated with elemental phosphorus which comprises:
   (a) compounding a batch for a phosphorus-containing glass having a viscosity of between about $10^5$–$10^{11}$ poises at temperatures in the range of 280°–900° C. selected from the group consisting of alkali phosphate glasses, alkaline earth phosphate glasses, and alumino-phosphate glasses, wherein $P_2O_5$ constitutes greater than 50 mol percent of the network forming constituents, said batch being free from compounds containing metals more readily reducible than phosphorus;
   (b) melting said batch with a reducing agent;
   (c) exposing the melt to a temperature in excess of 900° C.;
   (d) cooling said melt to a temperature at least below that at which the glass has a viscosity of about $10^5$ poises;
   (e) exposing the glass to a temperature between about 280°–900° C. at which the viscosity of the glass is between about $10^5$–$10^{11}$ poises for a period of time sufficient to attain cellulation; and then
   (f) cooling the cellulated glass to room temperature to coat elemental phosphorus on the cell walls.

2. A method in accordance with claim 1 wherein said reducing agent is present in the glass batch composition.

3. A method in accordance with claim 1 wherein said reducing agent is added to the molten glass.

4. A method in accordance with claim 1 wherein said molten glass is chilled rapidly to a viscosity below $10^{11}$ poises and then reheated to a viscosity between $10^5$ and $10^{11}$ poises to permit cellulation to occur.

5. A method in accordance with claim 1 wherein said glass batch composition is a glass frit.

6. A method in accordance with claim 1 wherein $P_2O_5$ constitutes between about 60–80 mol percent of the network forming constituents.

References Cited
UNITED STATES PATENTS

| | | | |
|---|---|---|---|
| 1,108,007 | 8/1914 | Ribbe | 106—41 |
| 2,473,958 | 6/1949 | Kreidl | 65—33 X |
| 2,992,930 | 7/1961 | Wheeler et al. | 106—40 |
| 3,151,966 | 10/1964 | Slayter | 65—22 |
| 3,174,870 | 3/1965 | Connelly | 106—40 |

DONALL H. SYLVESTER, *Primary Examiner.*

F. W. MIGA, *Assistant Examiner.*